June 21, 1960
O. M. CLINTON
2,941,650
ARTICLE ORIENTING DEVICE
Filed May 19, 1958
3 Sheets-Sheet 1
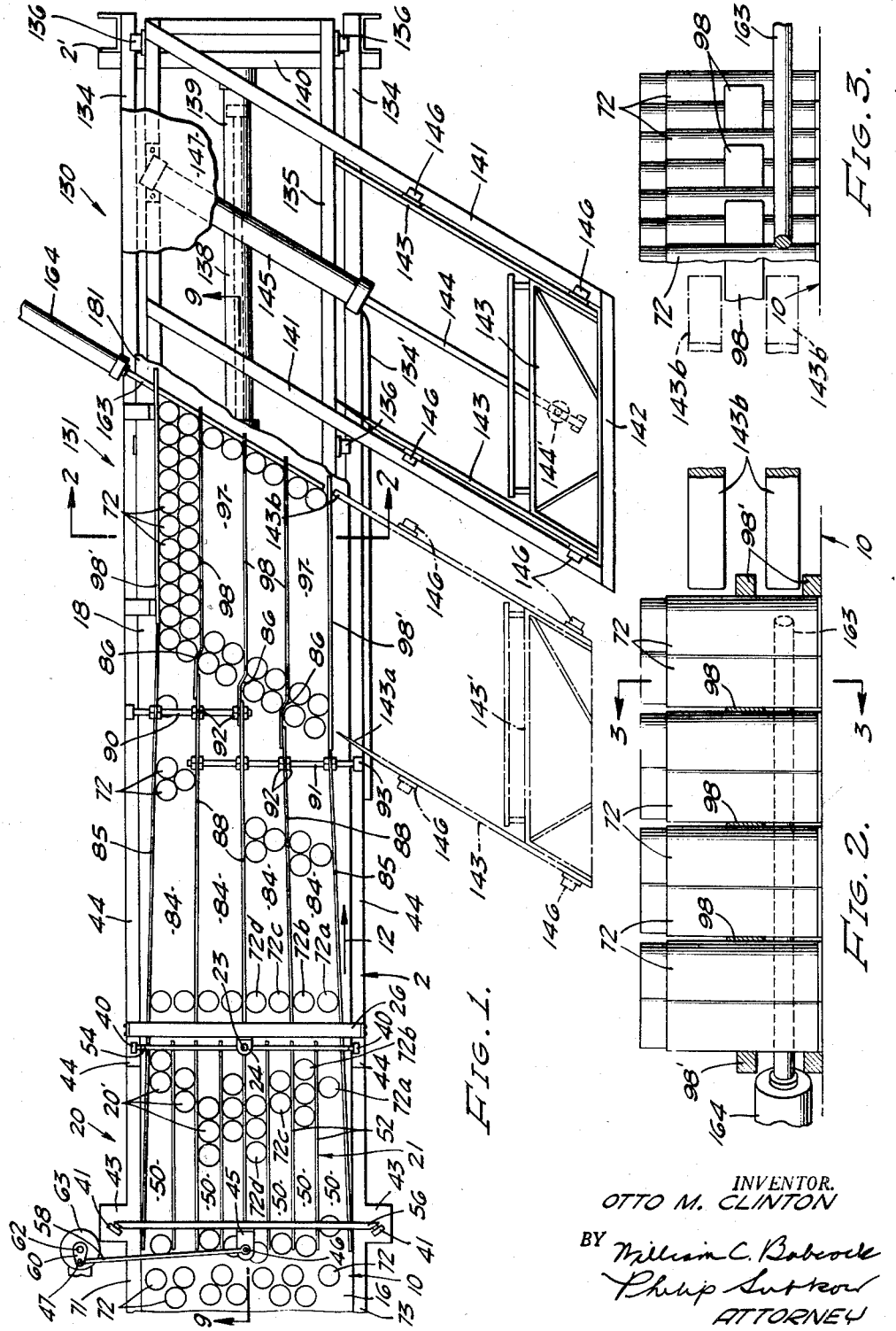
INVENTOR.
OTTO M. CLINTON
BY William C. Babcock
Philip Sutkow
ATTORNEY

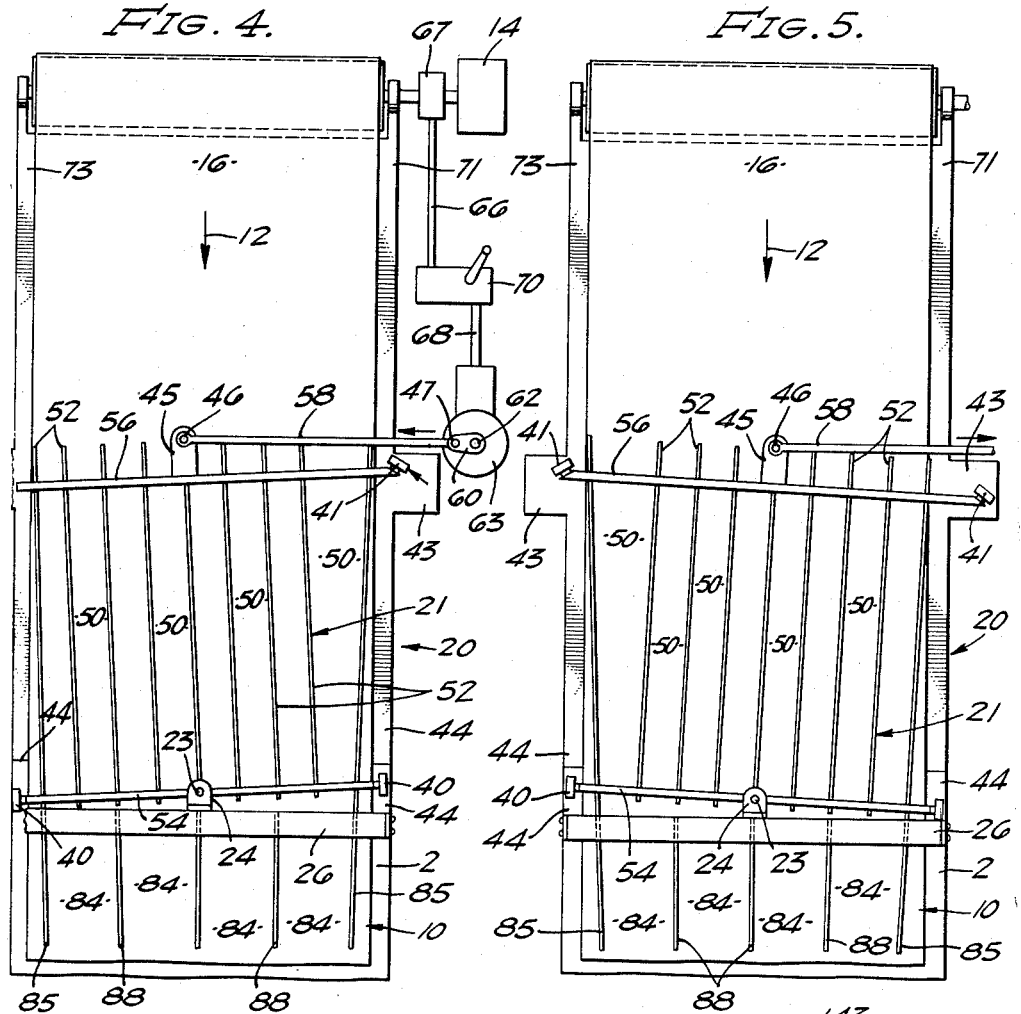

June 21, 1960     O. M. CLINTON     2,941,650
ARTICLE ORIENTING DEVICE

Filed May 19, 1958     3 Sheets-Sheet 3

INVENTOR.
OTTO M. CLINTON

BY William C. Babcock
Philip Sutton
ATTORNEY

United States Patent Office 2,941,650
Patented June 21, 1960

2,941,650

ARTICLE ORIENTING DEVICE

Otto M. Clinton, Glendale, Calif., assignor to General Mills, Inc., Minneapolis, Minn., a corporation of Delaware Filed May 19, 1958, Ser. No. 736,164

11 Claims. (Cl. 198—30)

The present invention relates to orienting devices, and more specifically to a non-jamming article-orienting device for conveyors and the like.

This application is a continuation-in-part of my application Serial No. 715,586, filed February 17, 1958.

Conveying systems employing orienting devices are used quite extensively in expediting the flow of material in modern industry. In such systems automatic or semi-automatic machinery is often employed for performing work motions upon the article conveyed. Thus it is necessary in some instances to provide an article orienting device which will orient or align the articles prior to their entrance to the station or machine where the work is performed. In certain types of filling machines, such as the can filling machines for inserting biscuit dough into cans for sale as refrigerated biscuits, it is particularly important to align and position the cans accurately beneath the filling mechanism. Such an orienting device should be capable of handling rapid flow of articles therethrough without jamming of the device.

It is therefore one object of my invention to provide an improved article orienting device for conveyors and the like which is substantially non-jamming and which will orient the articles in a plurality of rows in seriatim.

A further object of my invention is to provide a substantially non-jamming article orienting device for a conveyor or the like wherein said orienting device is adapted for reciprocation with respect to the flow of the moving articles to be oriented and wherein the frequency of said reciprocation is controlled with respect to the movement of the means for conveying the articles.

A still further object of my invention is to provide a substantially non-jamming article orienting device having one portion pivotally supported above a conveyor or the like and wherein the portion is adapted to move in a reciprocal transverse path above the conveyor and wherein randomly moving articles on said conveyor move through a series of channels being first oriented in rows in seriatim in the pivotally supported portion, and thereafter conveyed through converging channels wherein said articles are arranged in a staggered, nested, or interfitting arrangement.

Yet another object of my invention is to provide a substantially non-jamming article orienting device for conveyors which will receive a plurality of articles in an un-oriented fashion, will first orient said articles in a plurality of rows in seriatim, will guide said rows through converging channels into an angular staggered or interfitting nested arrangement and further will intercept said articles angularly of their direction of flow whereby the angular orientation of said articles is maintained for removal by a work performing device.

Other objects and advantages will become apparent in the following specification and the appended drawings in which:

Fig. 1 is a plan view showing an orienting device according to this invention, with a guide member or wobble plate assembly, and including means for segregating and clasping a group of oriented cans in a nested position for delivery to a can filling station;

Fig. 2 is a vertical section taken on line 2—2 of Fig. 1, showing the cans positioned between the offset members of my orienting device;

Fig. 3 is a sectional detail taken on line 3—3 of Fig. 2;

Fig. 4 is a partial plan view showing the guide member or wobble plate assembly reciprocated to an extreme position near one side of the conveyor;

Fig. 5 is a partial plan view like Fig. 4, showing the guide member or wobble plate assembly reciprocated to the extreme opposite side of the conveyor;

Fig. 6 is an enlarged plan view showing the orientation of a line of the cans adjacent the diagonal cam surface, and the diagonal fork which intercepts the cans so positioned;

Fig. 7 is a partial plan view similar to Fig. 6, showing the position of the cans as the fork moves forward;

Fig. 8 is a plan view similar to Fig. 6, showing orientation of the cans following complete interception by said fork.

Figure 9:
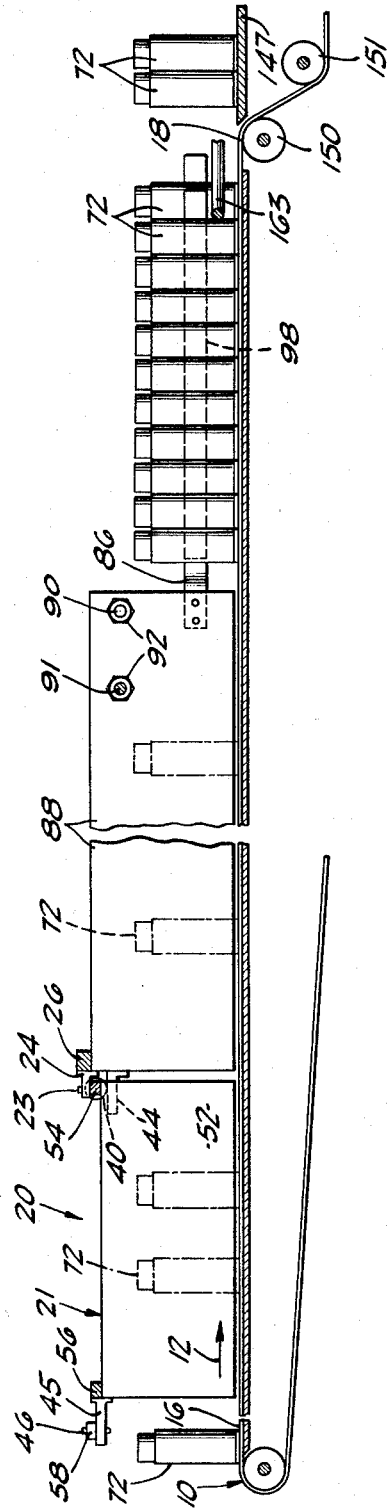
Fig. 9 is a longitudinal sectional view of the device of Fig. 1, taken on line 9—9 of Fig. 1.

Referring now to a detailed disclosure of the invention, a moving member in the form of a continuous conveyor 10 is shown, traveling in the direction of the arrow 12, and receiving motion from any desired or suitable source such as by a motor 14 (see Fig. 4).

For purposes of description, one end 16 of the conveyor 10 will be described as the inlet end or receiving station, while the opposite end 18 of the conveyor as seen in Fig. 1 will be described as the discharge end. Between these ends is the orienting station 20, the converging channels 84, the diagonal cam surfaces 86 and the offset channels 97, which cooperate to orient the articles or cans into a staggered or interfitting arrangement as described below.

The conveyor 10 receives a plurality of like articles, e.g., cans 72, in a random or haphazard fashion at its inlet or receiving end 16, as indicated in Fig. 1. The articles may be placed in the inlet end 16 of the conveyor 10 by an operator or they may be received from another conveyor or some other type of mechanical device (not shown). The articles are then moved by the conveyor 10 through an orienting station 20 having a device 21 which is pivotally mounted for transverse movement of its can receiving end across the path of the advancing cans. As the cans pass through the orienting device 21 they are oriented in continuous rows in seriatim as indicated at 20' in Fig. 1, and are fed in this fashion through the converging channels 84 and hence to the discharge end. At the angularly disposed cam surfaces 86 adjacent the discharge end of channels 84 the cans are arranged in staggered interfitting adjacent rows, and proceed in this manner through the offset channels to a diagonal stop 163 at discharge end 18. A work performing device clasps a group of cans in the offset channels between the discharge ends of the cam surfaces 86 and the diagonal stop 163 in the manner described more fully below. Such a device may be, for example, either a can filling or capping machine. The invention has particular utility in arranging empty cans in staggered interfitting or hexagonal formation so they can be fed and clamped in accurate filling positions by mechanism of the type shown in my above copending application Serial No. 715,586.

The orienting device 21 is in the form of a guide member or wobble plate assembly which is positioned above the conveyor 10 along its central longitudinal axis (see also Fig. 9) and is pivotally mounted at 23 on a bracket 24 connected to a cross member 26 suitably attached at its ends to the machine frame 2.

The wobble plate assembly 21 provides a plurality of channels 50 extending generally parallel to the central axis of the conveyor 10. These channels are formed by a plurality of vertically mounted, longitudinally extending wobble plates 52. The wobble plates 52 are spaced apart from each other slightly greater than the width of the article or can be oriented and are secured to end rods 54 and 56 which are positioned normal to the wobble plates at the ends of their top edges. The wobble plate assembly 21 is mounted on a pair of rollers 40 connected to the ends of rod 54, and on a second pair of rollers 41 connected to the ends of rod 56, the rollers 41 being arcuately positioned to guide the wobble plate assembly at its article receiving end along an arc formed by reciprocating pivotal movement of such end of the wobble plate on pivot 23, as seen in Figs. 4 and 5. Outwardly extending plates 43 are provided to furnish a supporting surface for the rollers 41, due to substantial displacement of the rollers 41 during reciprocation of rod 56, and the rollers 40 rest on the upper surface of plates 44, rollers 40 having relatively limited movement as compared to rollers 41. Plates 43 and 44 are suitably connected to the frame 2. The amplitude of transverse movement of the wobble plates at the entrance end to passages 50 is generally less than the width of one of the channels 50.

As can be seen in Figs. 4 and 5 of the drawings, the over-all width of the wobble plate assembly 21 is somewhat less than the width of the conveyor 10. The wobble plate at its article receiving end adjacent rod 56, reciprocates to each side a distance from its central position, equal to one-half the width of the articles to be oriented, in which outer position the wobble plate is at the edge of the conveyor. The wobble plate assembly is reciprocated across this distance to receive articles smoothly and without jamming, regardless of the lateral position of each article on the conveyor. To reciprocate the wobble plate assembly 21, a bracket 45 is connected to rod 56 and a connecting arm 58 is pivotally mounted at 46 at one end, and at its opposite end at 47 to an eccentric 60. The eccentric 60 is connected to a vertical shaft 62 emanating from a gear box 63 and is given relative rotational movement by the motor 14 which drives the conveyor 10.

The motor 14 drives through a gear box 67 to rotate shaft 66 which is connected to a speed changer 70. Another shaft 68 extends between the speed changer 70 and the gear box 63 and through this arrangement the motor 14 drives the eccentric 60. The eccentric 60 in turn actuates the connecting arm 58 to reciprocate the bracket 45. As the bracket 45 is reciprocated, the wobble plate assembly 21 is carried with it.

As shown in Figs. 4 and 5, the guide member or wobble plate assembly 21 pivotally mounted on the bracket 24 is swung in an arcuate path above the conveyor 10. Thus the receiving ends of the guide members 52 move across the path of the advancing articles, which are shown for descriptive purposes as a plurality of cans or containers 72.

These cans 72 are carried along the conveyor and guided between side plates 71 and 73 which are positioned along the sides of the conveyor 10. Since the cans 72 are positioned on the conveyor 10 in a haphazard or random fashion, each of them travels in a different path along the conveyor 10. Reciprocation of the wobble plate assembly 21 moves the inlet ends of the channels 50 transversely relative to the paths of the individual cans 72 so that a can which is not originally aligned with a channel will be able to enter the channel more readily. Thus the cans are channeled through the orienting device in a plurality of separate rows 20' which are further received between the converging plates 88 as will now be described.

The converging channels 84 extend generally along the central axis of the conveyor 10 and are formed between vertically mounted longitudinally disposed outer guides 85 and inner guides 88. The guides 85 and 88 are supported at one end above the conveyor 10 (see Fig. 9) by the transversely extending cross member 26, and guides 85 and 88 are supported near their opposite ends on a pair of threaded cross bolts 90 and 91 having spaced pairs of nuts 92 mounted thereon, between each pair of which a guide member 85 or 88 is supported. By properly adjusting the nuts along bolts 90 and 91 the degree of convergence of the guides 85 and 88 can be adjusted as desired. The bolts 90 and 91 are mounted on brackets 93 suitably connected to the longitudinal side plates 71 and 73. The height of members 26, 90 and 91 is greater than the height of the cans 72, so that the cans pass under these members as the cans travel along belt 10, as seen in Fig. 9.

The receiving ends of guides 88 are spaced apart a distance corresponding to the width of two of the channels 50 of the wobble plate assembly 21. Thus two rows of cans 72a and 72b will pass through into one of the channels 84 as seen in Fig. 1 and the next two rows of cans 72c and 72d will pass into the adjacent channel 84, etc. The cans 72 upon leaving the channels 50 of the wobble plate assembly 20 thus are presented to the channels 84 in side by side relation. The spacing between the adjacent guides 85 and 88 which form the channels 84 is such, however, that the cans cannot move along the conveyor 10 in a side by side relationship, and, therefore, the cans move through the converging guides 85 and 88 in a staggered relationship.

Figure 6A:
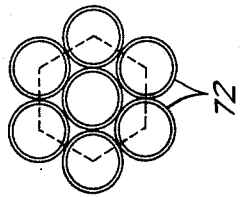
Fig. 6a is a diagrammatic illustration of the hexagonal nesting arrangement of the cans by the orienting device of the invention.

Specifically, the spacing between the guides 85 and 88 adjacent the wobble plate assembly 21 is approximately twice the width of the cans passing therebetween with the spacing gradually diminishing or tapering toward the far end of the guides adjacent the diagonal cam surfaces 86. Therefore, each row of cans 72a in a channel 84 is staggered more and more with respect to the adjacent row 72b as the cans move along the conveyor 10. The same is true of cans 72c and 72d in the next channel 84. By the time the cans reach the discharge ends of channels 84 adjacent rows of cans are in their most tightly nested diagonal arrangement. In such position, a single can may be surrounded by six adjacent cans, and a hexagon shown in dotted lines in Fig. 6a, can be formed by connecting the centers of such six cans. Hence this tightly fitting arrangement is also termed herein a "hexagonal" arrangement.

At the discharge end of the channels 84 and connected to the outlet ends of the inner guides 88 as by brazing is a series of offset guide plates or extensions 98, which are free at their opposite ends 98a (see Fig. 3). The offset extensions 98 and the outer guide members 98' form an adjacent series of parallel offset channels 97, and are constructed of relatively flexible sheet material and are provided with a short bent portion adjacent the ends of members 88, forming a diagonal cam surface 86 for the cans 72, which cooperate with a diagonal fork 143 described below to separate the last diagonal row of cans at the discharge end of channels 84 from the adjacent diagonal row of cans in the offset channels 97, as described more fully below. The angular disposition of the diagonally positioned cam surfaces or jogs is perpendicular to the diagonal stop 163 which retains the nested cans adjacent the end 18 of the conveyor. The angle of such cam surfaces 86 preferably corresponds to the most tightly nested arrangement of the cans. Various angles can be used, but preferably the cam surfaces 86 are positioned at about a 30° angle to the longitudinally extending portions of the offset extensions 98.

The cans 72 proceed in their diagonal arrangement past the outlet ends of the converging passages 84, are jogged slightly at the cam surfaces 86 and then pass in two tightly fitting staggered rows into each of the channels 99 formed by the guides 98 until the front line of cans abuts against the stop 163. When the cans reach the cam surfaces 86 and thereafter during passage of the cans through channels 97, the cans in adjacent rows have their maximum degree of offset.

The orienting device of the invention is preferably employed in cooperation with the reciprocable carriage mechanism of my above copending application, which takes up a predetermined number of cans in the staggered orientation provided by the device of the instant invention, and shifts such cans presented in diagonal alignment to a can filling device.

Referring to Fig. 1, numeral 130 designates a filling station, and a carriage 135 reciprocates between this station and station 131, at which it collects a predetermined number of cans in staggered longitudinal alignment and then presents the cans at station 130, where the cans are filled, e.g., with biscuit dough. At packaging station 130 is positioned a framework 2' carrying the rails 134 on which is positioned the carriage 135 mounted on rollers 136 for reciprocation upon the rails 134. The carriage 135 is reciprocated by means of the ram 138 operating in cylinder 139 which is mounted at its rear end upon the cross rail 140 positioned on the frame 2'. Mounted on the carriage 135 is a pair of spaced rails 141 connected by a cross member 142. The rails 141 each carry a fork 143 composed of two parallel tines connected by a base member 143', to which is connected the ram 144 of the power cylinder 145, the rear end of which is connected to the carriage 135. The fork is reciprocated on rollers 146 which roll on the rails 141.

Mounted above the cylinder 145 is a plate 147 (see Fig. 9) suitably supported from the frame. The belt 10 extends at an elevation equal to that of the plate 147 until it reaches the position of 147, at which time it passes over and under rollers 150 and 151 to pass beneath the plate 147 and then to an elevation parallel to its original position. Positioned immediately in front of the plate 147 and the roller 150 is the ram or stop 163 actuated by a cylinder 164 mounted on the frame. The ram 163 extends parallel to the ram 144, the rails 141 and the forks 143, all being preferably disposed at a 60° angle to the longitudinal axis of belt 10.

After a group of cans held in position at the filling station 130 have been filled, cylinder 145 is actuated to extend the ram 144 into the position shown in Fig. 1. This withdraws the forks 143 to remove the forks from the nest of cans 72. Upon the extension of 144 the ram 138 of cylinder 139 is actuated to move the carriage 135 to the left, as shown in dotted lines in Fig. 1. The forks 143 are thus moved into position to embrace the group of cans on the belt 10 positioned immediately ahead of the plate 147 and located in the offset passages 97, and the right-hand fork 143 is in line with the ram 163 (see Fig. 1).

It will be noted that while the carriage is at the filling station 130 and during movement thereof to the dotted line position shown in Fig. 1, with the base member 143' still extended by the ram 144, the ram 163 is in fully extended position, holding the front longitudinal line of oriented cans in channels 97 of station 131 in position. The ram 144 is then retracted and the forks 143 are moved into position to embrace the group of angularly staggered nested cans at station 131, as described below.

Referring to Figs. 6 to 8, as the left fork 143 carrying tines 143a (similar to tines 143b of the right fork 143; see Fig. 2), moves inward toward the belt 10, the tines 143a pass over and under the outer rail 98' similar to the showing for tines 143b in Fig. 3, and make contact along their left edge with the outer periphery of a first can 72x of the two adjacent diagonally disposed cans 72x and 72y in the short angularly disposed channels 86' adjacent the discharge end of the converging channels 84. As the tines 143a continue to move in the direction of the arrow in Fig. 6 to the position shown in Fig. 7, the wedge shaped tines 143a tend to rotate and push the cans 72x and 72y in the direction of the arrow shown in Fig. 7 and against the rear cam surface 86 as indicated at 100a in Fig. 7. As the tines 143a proceed to move in the same direction, as indicated in Fig. 8, the left edge of the thicker rear portions 143a' of the tines 143a contact the periphery of cans 72x and 72y to the left of the tines, pushing said cans a small amount toward channels 84, so that the cans 72x and 72y have now cleared the cam surfaces 86 and have moved back into contact with the guides 88 of channels 84. Hence cans 72y tend to ride along the cam surfaces 86 from their position in Fig. 7 to their position shown in Fig. 8. It will be noted that when the tines 143a have completed their movement across the rows of cans, the first row of cans 72p to the right of the tines are in regular longitudinal staggered arrangement, and the adjacent rows of cans 72r and 72s are positioned in a like parallel arrangement.

It has been found that the angularly disposed cam surfaces 86 at the ends of the guides 88 are necessary in order to permit the tines 143a of the left fork 143 to intercept the longitudinal rows of cans without puncturing or injuring a can, and without jamming of the cans in the vicinity of the discharge end of channels 84 and the entrance to channels 97. In this respect it is noted that for best results the tines 143a should be positioned substantially normal to the cam surfaces 86.

Simultaneously with the movement of the left fork 143 in the direction shown in Figs. 6 to 8, the right fork 143 carrying the tines 143b moves toward the belt 10, the tines passing over and under the outer rail 98' (see Fig. 3). The lower tine 143b is in alignment with and abuts the end of the stop or ram 163 and pushes the ram into cylinder 164, no pressure being exerted in 164 to oppose this motion. Both forks 143 move in until the roller 144' mounted underneath 143' abuts the rail 134'. The carriage 135 has now embraced a group of cans in staggered longitudinal nested arrangement between the left and right forks 143 for delivery to the filling station 130.

As the carriage 135 moves to the right, the roller 144' is held against the rail 134'. After a time sufficient to permit the carriage 135 to move the group of cans off the belt 10 and onto plate 147, the ram 163 is moved back into the position shown in Figs. 1 to 3, to hold the last diagonal row of cans including cans 72x and 72y, which have now proceeded to the discharge end 18, from moving as the belt 10 continues in motion. The continued motion of the carriage 135 to the right moves the nest of cans embraced by forks 143 into position at station 130 for filling. Simultaneously with such movement, the cans at station 130 which have been filled, e.g., by the can filling device of my copending application, are shoved off plate 147 to the right for discharge by a conveyor (not shown).

The carriage mechanism described above is substantially the same as that described in my aforementioned copending application.

From the foregoing, it is seen that I have provided a device comprising means for positively nesting a plurality of cans or articles in an efficient clamping or nesting arrangement whereby damage to the articles is reduced and whereby unoriented articles are continuously fed along a conveyor and removed in a nested oriented arrangement.

When my device is employed in the alignment of cans for cooperation with the can positioning and filling mechanism of my copending application, the cans are aligned in longitudinal rows with the cans in each row displaced longitudinally by less than the width of one can with respect to the cans in the adjacent row or rows, so that the cans are clamped firmly in a diagonal interlocking or nested pattern without possibility of accidental displacement during the filling operation.

While I have described specific embodiments in illustrating my invention, it is to be realized that various modifications and changes will occur to those skilled in Now, therefore, I claim:

1. In an article orienting device, a conveyor means, a stationary channel means for receiving a plurality of cans in straight parallel rows and forming them into a diagonally disposed arrangement, said channel means having a plurality of converging channels each adapted to receive two of said rows, each said channel converging to a width substantially less than the width of two cans and thereby forming said cans into a nested arrangement as they pass through the channels, a plurality of second channels communicating with the converging ends of said converging channels, said second channels being offset from said converging channels, a short angularly positioned channel connecting adjacent converging and second channels, said short angularly positioned channels and said second channels forming said rows of articles into a diagonally disposed arrangement, and a diagonal stop means projecting into the path of said rows adjacent the discharge ends of said second channels, and retaining said rows in said diagonal arrangement, said stop being disposed substantially normal to said angularly positioned channels.

2. In the combination of claim 1, means for intercepting a diagonal row of cans in said angularly positioned channels, and means for withdrawing said stop and holding back the row of articles adjacent the discharge end of said second channels, said two last mentioned means being disposed at the same angle as said stop, said two last mentioned means embracing a group of said articles in said second channels, arranged in a staggered, nested, diagonal interfitting arrangement.

3. A non-jamming article orienting device comprising a conveyor means, a first means above the conveyor for orienting said articles into a plurality of rows in seriatim, a second means above said conveyor for receiving a duality of rows from said first means, an offset means cooperating with said second means whereby said rows are formed into an offset arrangement while moving through said second means, and a stop means projecting into the path of said rows adjacent said offset means whereby said articles are retained in a nested diagonal formation.

4. An article orienting device comprising a first channel means having a plurality of longitudinally extending channels mounted for reciprocation and spaced apart slightly greater than the width of a single article to be oriented, means for moving a plurality of unoriented articles longitudinally of said first channel means, reciprocal means for moving said first channel means transversely of the path of said articles wherein said articles pass through said channels in rows in seriatim, a second channel means adjacent said first channel means and having a plurality of converging channels each adapted to receive a duality of rows from said first means, an offset means on said second channel means forming said rows into a diagonally disposed arrangement, and a diagonal stop means projecting into the path of said rows retaining them in said diagonal arrangement.

5. In a non-jamming article orienting device the combination comprising an orienting station having a plurality of longitudinally extending channels mounted for reciprocation and spaced apart slightly greater than the width of a single article to be oriented, a conveyor means for moving a plurality of unoriented articles longitudinally of said first channel means, reciprocal means for moving said first channel means in an arcuate path transversely of the path of said articles wherein said articles pass through said channels in rows in seriatim, a second channel means adjacent said first channel means and having a plurality of converging channels each adapted to receive a duality of rows from said first means, an offset means on said second channel means forming said rows into a diagonally disposed arrangement, and a diagonal stop means projecting into the path of said rows retaining them in said diagonal arrangement.

6. In a non-jamming article orienting device the combination comprising an orienting station having a plurality of longitudinally extending channels mounted for reciprocation and spaced apart slightly greater than the width of a single article to be oriented, a conveyor means for moving a plurality of unoriented articles longitudinally of said first channel means, reciprocating means for moving said first channel means in an arcuate path transversely of the path of said articles whereby said articles are urged into and pass through said channel means in straight single rows, a second channel means adjacent said first channel means and having a plurality of converging channels each adapted to receive a duality of rows from said first means, a plurality of third channels communicating with the converging ends of said converging channels, said third channels being offset from said converging channels, a short angularly positioned channel connecting adjacent converging and third channels, said short angularly positioned channels and said third channels forming said rows of articles into a diagonally disposed arrangement, and a diagonal stop means projecting into the path of said rows adjacent the discharge ends of said third channels, and retaining said rows in said diagonal arrangement, said stop being disposed substantially normal to said angularly positioned channels.

7. In a non-jamming article orienting device the combination comprising an orienting station having a plurality of longitudinally extending channels mounted for reciprocation and spaced apart slightly greater than the width of a single article to be oriented, a conveyor means for moving a plurality of unoriented articles longitudinally of said first channel means, reciprocating means for moving said first channel means in an arcuate path transversely of the path of said articles whereby said articles are urged into and pass through said channel means in straight single rows, a second channel means adjacent said first channel means and having a plurality of converging channels each adapted to receive a duality of rows from said first means, a plurality of third channels communicating with the converging ends of said converging channels, said third channels being offset from said converging channels, a short channel positioned at about a 30° angle to the longitudinal axis of said conveyor means and connecting adjacent converging and third channels, said short angularly positioned channels and said third channels forming said rows of articles into a diagonally disposed arrangement, and a diagonal stop means projecting into the path of said rows adjacent the discharge ends of said third channels, and retaining such rows in said diagonal arrangement, said stop being disposed at an angle of about 60° to said axis.

8. In an article orienting device, a conveyor means, a stationary channel means for receiving a plurality of cans in straight parallel rows and forming them into a diagonally disposed arrangement, said channel means having a plurality of converging channels each adapted to receive two of said rows, each said channel converging to a width substantially less than the width of two cans and thereby forming said cans into a nested arrangement as they pass through the channels, a plurality of second channels communicating with the converging ends of said converging channels, said second channels being offset from said converging channels, a short channel positioned at about a 30° angle to the longitudinal axis of said conveyor means and connecting adjacent converging and second channels, said short angularly positioned channels and said second channels forming said rows of articles into a diagonally disposed arrangement, and a diagonal stop means projecting into the path of said rows adjacent the discharge ends of said second channels, and retaining said rows in said diagonal arrangement, said stop being disposed at an angle of about 60° to said axis.

9. In the combination of claim 6, means for intercepting a diagonal row of cans in said angularly positioned channels, and means for withdrawing said stop and holding back the row of articles adjacent the discharge end of said third channels, said two last mentioned means being disposed at the same angle as said stop, said two last mentioned means embracing a group of said articles in said third channels, arranged in a staggered, nested, diagonal interfitting arrangement.

10. A non-jamming article orienting device including a wobble plate assembly comprising a plurality of longitudinally extending, vertical wobble plates spaced apart on said assembly, said spacing being constant along the length of said wobble plates and fixed at a slightly greater extent than the width of a single article, a frame adjacent said assembly, conveyor means for moving a plurality of like articles to be oriented haphazardly along a path longitudinally of the wobble plates, a pair of support plates on said frame positioned transversely of said conveyor means adjacent the opposite longitudinal edges thereof, rollers on said support plates and attached to one end of said assembly on opposite sides thereof for supporting said assembly on said support plates, means pivotally attaching said wobble plate assembly at its other end to said frame superjacent the central longitudinal axis of said conveyor means, and reciprocating means connected to said one end of said wobble plate assembly for moving said assembly arcuately about said pivoting means and transversely of the path of the articles, with said rollers moving on said support plates, whereby said articles pass between said vertical wobble plates and are oriented in a plurality of rows in seriatim.

11. In an article orienting device, a conveyor means, a stationary channel means for receiving a plurality of cans in straight parallel rows and forming them into a diagonally disposed arrangement, said channel means having a plurality of converging channels each adapted to receive two of said rows, each said channel converging to a width substantially less than the width of two cans and thereby forming said cans into a nested arrangement as they pass through the channels, a plurality of second channels communicating with the converging ends of said converging channels, said second channels being offset from said converging channels, and a short angularly positioned channel connecting adjacent converging and second channels, said short angularly positioned channels and said second channels forming said rows of articles into a diagonally disposed arrangement.

References Cited in the file of this patent

UNITED STATES PATENTS

| | | |
|---|---|---|
| 791,243 | Carlson | May 30, 1905 |
| 804,459 | Ellingwood | Nov. 14, 1905 |
| 1,079,165 | Conte | Nov. 18, 1913 |
| 2,535,880 | Tomkins | Dec. 26, 1950 |

FOREIGN PATENTS

| | | |
|---|---|---|
| 739,385 | Great Britain | Oct. 26, 1955 |